United States Patent [19]

Shifferly

[11] Patent Number: 5,271,135
[45] Date of Patent: Dec. 21, 1993

[54] DEBURRING TOOL

[76] Inventor: John P. Shifferly, 215 Stagecoach Trail, Greensboro, N.C. 27409

[21] Appl. No.: 790,492

[22] Filed: Nov. 12, 1991

[51] Int. Cl.$^5$ .................. B23D 79/04; B23D 79/08; B23D 71/06; B23B 45/12
[52] U.S. Cl. .................................... 29/78; 29/80; 81/59.1; 408/120; 408/238
[58] Field of Search ............... 29/78, 80; 81/59.1, 81/436; 408/120, 123, 227, 238; 7/157

[56] References Cited

U.S. PATENT DOCUMENTS

| 75,093 | 3/1868 | Weston | 408/120 |
|---|---|---|---|
| 342,119 | 5/1886 | Miller | 408/120 |
| 1,648,134 | 11/1927 | Kientz | 81/57.3 |
| 1,878,053 | 9/1932 | Winger | 81/59.1 |
| 1,994,522 | 3/1935 | Klinger | 29/80 |
| 2,749,953 | 6/1956 | Rundle | 29/78 |
| 2,897,932 | 8/1959 | Morgan | 81/59.1 |
| 2,965,383 | 12/1960 | Steiner et al. | 81/177.85 |
| 2,977,668 | 4/1961 | Maness | 29/80 |
| 3,120,961 | 2/1964 | Clarkson | 408/238 |
| 3,398,612 | 8/1968 | Batten | 81/59.1 |
| 4,679,468 | 7/1987 | Gray | 81/121.1 |
| 4,713,881 | 12/1987 | Lange et al. | 81/129 |

FOREIGN PATENT DOCUMENTS

| 2244222 | 3/1973 | Fed. Rep. of Germany | 81/59.1 |
|---|---|---|---|
| 2145359 | 3/1985 | United Kingdom | 81/59.1 |

OTHER PUBLICATIONS

Catalog #587, Industrial Pipe & Steel Co., 9936 E. Rush Street, South El Monte California, pp. 6 and 209.
"Summertime Savings", Catalog of Industrial Pipe & Steel Co., 9936 E. Rust St. South El Monte, California 91733, pp. H146, H191, and back page.
Catalog Miller Industrial Tools, Inc., 7111 Hayvenhurst Ave., Van Nuys, CA 91406 (undated).
"Aircraft Tool Catalog," Aircraft Tool Supply Co., P. O. Box 370, 1000 Old U.S.-23, Oscoda, MI 48750 (undated), p. 68.

Primary Examiner—William E. Terrell
Attorney, Agent, or Firm—Steven J. Hultquist

[57] ABSTRACT

A hand-held deburring tool comprising a handle member with a distal end having a cavity therein, within which a unirotary ratchet bearing is disposed. The unirotary ratchet bearing has a deburring tip element-receiving bore therein for engaging the shank of a deburring tip element positioned therewithin. A support element is mounted in a lower portion of the cavity in the handle member, for abutting contact with a proximal shank extremity of a deburring tip element positioned within the bore of the unirotary ratchet bearing. This tool accommodates a wide variety of deburring tip elements which are positionable with the proximal shank portion thereof in the bore of the unirotary ratchet bearing and with the proximal extremity thereof in abutting contact with the support element. The deburring tool may be usefully employed to remove burring or flashing from holes or openings in a wide variety of workpieces, e.g., aluminum plate stock.

10 Claims, 2 Drawing Sheets

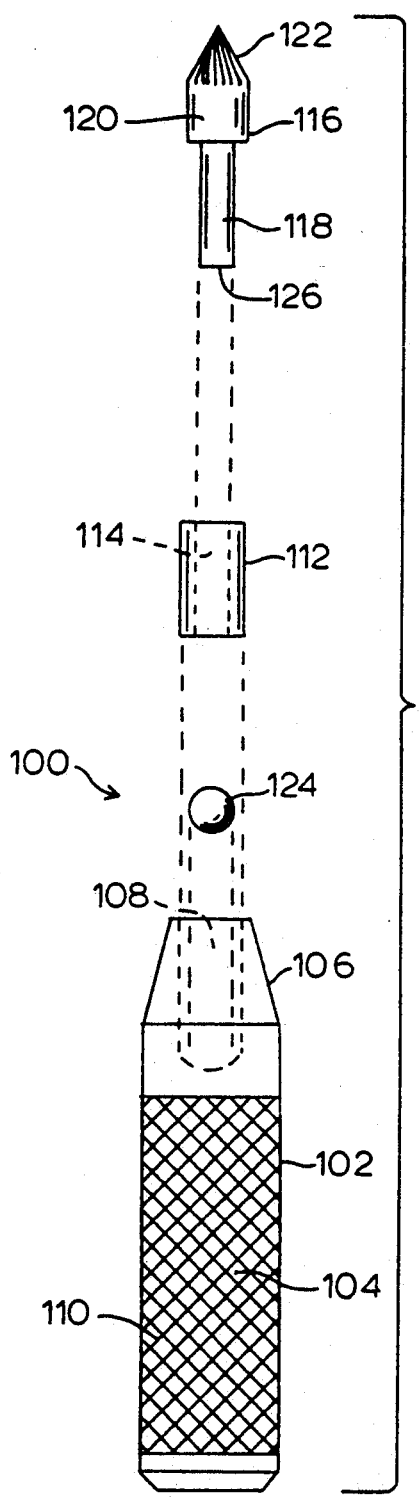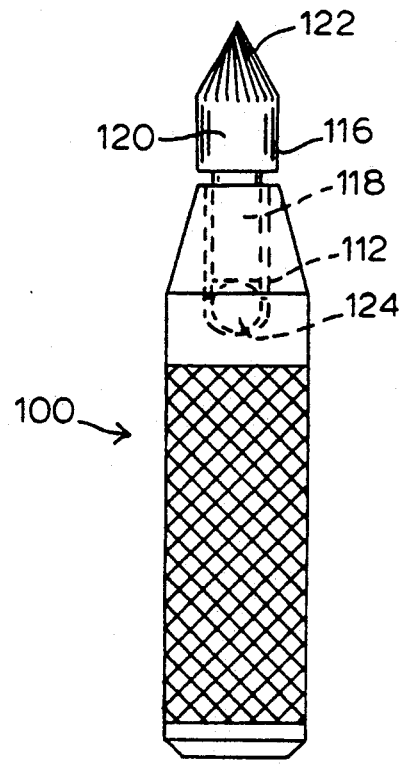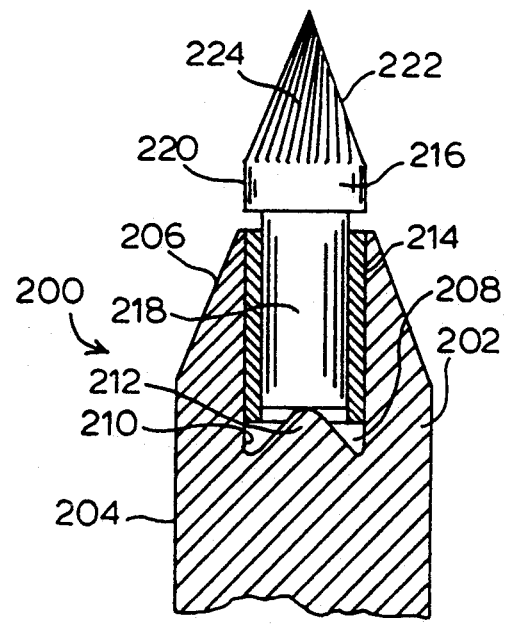
FIG. 1
FIG. 2
FIG. 3

DEBURRING TOOL

BACKGROUND OF THE INVENTION

1. Field of the Invention

The present invention relates to a deburring tool, of a manual or hand-held character, which may be utilized to remove burring or flashing from metal workpieces, such as may result from drilling, milling, punching, or initial forming of the workpiece article.

2. Description of the Related Art

In the field of fabrication of structural elements and articles, involving milling, drilling, machining, and related fabrication or forming operations, workpieces are produced having burring or flashing at the locus of processing, which is required to be removed to render the workpiece article satisfactory for subsequent usage.

If such burring or flashing detritus is not removed, the resulting article may not adequately mate with cooperative parts in a desired assembly comprising the workpiece article, or the fit of such article in its desired end use application structure may not be accommodated.

In addition to difficulties of use created by such extraneous residual material produced in the processing of the workpiece, the burr or flashing may also represent a hazard, as for example in the case of metal structures, in which the burr or flashing surrounding drilled holes may damage or injure persons or things coming into contact therewith. Similar hazards are also present when tapping or other machining operations are employed to finish the workpiece article.

The burring or flashing resulting from edge cutting or shaping of workpiece articles may involves a linear cut or edge profile which is readily amenable to sanding, grinding, or other deburring operations for removing the burr or flash material. In the case of drilled, punched, or tapped openings, particularly of circular cross-section, e.g., in the formation workpiece articles comprising plate stock, it is common practice to utilize hand-held deburring tools.

A wide variety of deburring tools has been devised and is in common use, particularly in metal machining operations, e.g., those involving drilling or tapping of aluminum plate stock or other sheet metal elements.

A "Scraper and Deburring Tool", MSB-1161, is commercially available from Industrial Pipe & Steel Company (South El Monte, Calif.). This tool includes a stylus-type handle serving as a holder for a longitudinally extending tip member, of general pencil-like shape, having a conical distal tip and a cylindrical main body with a series of circumferentially spaced-apart, longitudinally-extending ridges. This tool thus serves as a drilled hole reamer or grinding means for removing burring or flashing. A disadvantage of this type of tool is that it must be manually rotated to effect the desired deburring or deflashing action. Thus, its extent of rotation in a single turn is limited by the arc of the user's wrist movement, which is generally less than 270° arc length in a single turn. Following an initial turn, the tool must be released and the user's hand must be repositioned to effectuate a new turn. This presents difficulties in terms of the ease and speed of use of such tool.

A deburring tool set is available from the same manufacturer (Industrial Pipe & Steel Company, South El Monte, Calif.), which comprises a generally cylindrical handle, a shaft-like telescoping holder, and deburring blades of generally flattened S-shape. The blade comprises a first segment coaxially alignable with the telescoping holder, which in turn is coaxially positionable in the handle. The opposite extremity of the blade is elongated in form, with a longitudinal axis parallel to the first, coaxial segment, but radially displaced therefrom, with an intermediate angular connecting segment between the respective end segments. The distal extremity of the blade features a deburring surface. In the use of this tool, the blade is reposed at its proximal end in the telescoping holder, which in turn is mounted in the handle. The handle then is rotated relative to the distal extremity of the deburring blade, in the manner of a brace-and-bit hand drill. Rotary motion thereby is imparted to the deburring surface at the distal extremity of the blade, whereby burring or flashing is removable from a hole in which the distal blade extremity is positioned. While this device overcomes the deficiencies of the stylus-type deburring tool described hereinabove, the off-set character of the handle of such tool and its impartation of rotation to the distal deburring surface through a laterally extended arm (i.e., the intermediate connecting segment of the blade element) results in the overall device being somewhat unwieldy. As a result, in the operation of this device, the deburring blade has a tendency to jump or laterally disengage from the hole in which it is disposed, causing scoring of the surrounding surface of the workpiece article, or at the least involving loss of time and efficiency, and requiring expenditure of some effort to overcome the inherent clumsiness of such tool. Further, the off-set character of the overall device creates an accessibility problem, in instances where the structure surrounding the workpiece portion bearing the flash-bearing hole is difficult to access other than in a direct or linear fashion (in such instances, the stylus-type deburring tool previously described could be suitably employed, but with the previously mentioned deficiencies attendant its use).

A similarly constructed deburring tool is available as Speed Deburring Tool No. SP275 from Aircraft Tool Supply Company (Monroe, La.). This tool also uses a radial off-set arrangement, and comprises a handle member to which a proximal coaxial shaft segment is joined. The distal end of this first segment is connected to a laterally outwardly and downwardly extending slant arm intermediate portion, which at its distal portion is connected to a linear distal portion which is parallel to (and laterally displaced from) the first segment and the handle in which the first segment is reposed. At the extremity of the distal segment is mounted a deburring element. The deburring element comprises a main cylindrical body portion, of greater diameter than the distal segment to which it is joined, and having a conical extremity with a deburring structure on its exterior surface. This deburring tool, of similar configuration to the Deburring Tool Set which is commercially available from Industrial Pipe & Steel Company, suffers from the same deficiencies as described above in its intended use. Further, the Speed Deburring Tool of Aircraft Tool Supply Company features the tip element as a threaded member attaching to the off-set proximal segment of the extension member joined to the handle. The tip element thus is specific to such Speed Deburring Tool, and cannot accommodate the wide variety of deburring tip elements which are widely commercially available.

Such deburring tip elements generally are of standard sizes including $\frac{1}{4}$ inch, $\frac{3}{8}$ inch, and $\frac{1}{2}$ inch) with other sizes (3/16 inch, 5/16 inch, $\frac{3}{8}$ inch, $\frac{3}{4}$ inch, and $\frac{7}{8}$ inch, also being available. These deburring tip elements generally feature a longitudinally extending shank portion of suitable material, as for example hardened steel, which at its distal end is joined to the tip member. This tip member generally comprises a short cylindrical portion forwardly of which is provided a conical-shaped cutting portion featuring ridges, grooves, and blade surfaces, as appropriate to the deburring operation.

These deburring tip elements are adapted for use in power drills, such as hand-held electric drills, wherein the tip element is utilized in the same fashion as a drill bit, with respect to its retention by the drill.

The difficulty of using such deburring drill bits in an automatic or power drill relates to the fact that power drill speeds are generally relatively high, even in the case of variable-speed drills. It frequently is difficult to avoid deburring or deflashing a hole or opening, without doing damage to the workpiece by undesired penetration of the deburring tip element into the workpiece surrounding the hole being deburred. Further, for the same reason of relatively high rotational speed, such deburring tip elements in practice frequently "jump" from the hole and score or otherwise mar the surrounding workpiece surface, or otherwise are difficult to manually control with a hand-held power drill.

The foregoing problems may be alleviated to some extent by use of a drill press in which the deburring tip element is employed, wherein the depth of penetration of the deburring tip element is selectively fixed by mechanical adjustment of the drill press arm in a conventional manner, but this requires the substantial capital investment and operational expense of a drill press apparatus, and such apparatus moreover cannot readily accommodate large-sized workpiece articles.

Deburring tip elements with a wide variety of shapes other than the conical-tipped deburring tips described above, are also available, including olive-shaped tips, tree-pointed shaped tips, cylindrical radius end-shaped tips, U-shaped concave radius deburring tips, inverted conical tips, etc., as widely available from a variety of commercial sources, as for example Miller Industrial Tools, Inc. (Van Nuys, Calif.).

It would therefore be a significant advance in the art to provide a deburring tool which is hand-held in character, simple in construction, and free of the off-set articulated extension arms utilized in prior art hand-held deburring tools, and which is readily adaptable to accommodate a wide variety of commercially available deburring tip elements featuring a cylindrical shank of appropriate size (diameter).

It therefore is an object of the present invention to provide a hand-held deburring tool of such type.

Other objects and advantages of the present invention will be more fully apparent from the ensuing disclosure and appended claims.

SUMMARY OF THE INVENTION

The present invention relates generally to a hand-held deburring tool, comprising:

(a) an elongate, generally cylindrical handle member of a manually graspable size, having a distal end with a cavity therein;

(b) a unirotary ratchet bearing disposed in the cavity and having a deburring tip element-receiving bore therein for engaging the shank of a deburring tip element positioned therewithin; and (c) a support element mounted in a lower portion of the cavity for abutting contact with a proximal shank extremity of a deburring tip element positioned within the bore of the unirotary ratchet bearing, such support element accommodating unirotational movement of the deburring tip element in the unirotary ratchet bearing.

The deburring tool broadly described above may be utilized with a wide variety of deburring tip elements of commercially available character. The deburring tip element employed therewith will have a proximal shank portion which is positionable within the bore of the unirotary ratchet bearing, and a proximal shank extremity in abutting contact with the support element. The shank portion at its extremity may suitably comprise a flat circular face which is generally perpendicular to the longitudinal axis of the shank portion of such deburring tip element.

As used herein, the term "unirotary" in reference to a ratchet bearing means that the bearing is engageable with a driven member, such as the shank of a deburring tip element, in such manner that rotation of the bearing in a first direction of rotation will couplingly rotate the driven member engaged therewith, while rotation of the ratchet bearing in an opposite direction will be "free-wheeling" or non-driving in character with respect to the driven member—in other words, in such opposite direction of rotation of the ratchet bearing, the ratchet bearing rotates against the (stationary) driven member, without effecting rotation of such driven member.

A wide variety of unirotary ratchet bearing elements are potentially usefully employed in the broad practice of the present invention, as hereinafter more fully described.

In another aspect of the invention as broadly described hereinabove, the above-described hand-held deburring tool comprising elements (a), (b), and (c) is utilized in combination with:

(d) a deburring tip element with a proximal shank portion positioned within the bore of the unirotary ratchet bearing and a proximal shank extremity in abutting contact with the support element.

Other features and aspects of the invention will be more fully apparent from the ensuing disclosure and appended claims.

BRIEF DESCRIPTION OF THE DRAWINGS

FIG. 1 is an exploded front elevation view of a deburring tool according to one embodiment of the present invention.

FIG. 2 is a fully assembled deburring tool of the type shown in FIG. 1, comprising a deburring tip element mounted at the distal end of the tool.

FIG. 3 is a sectional elevation view of a deburring tool according to another embodiment of the present invention.

DETAILED DESCRIPTION OF THE INVENTION, AND PREFERRED EMBODIMENTS THEREOF

Figure 1A:
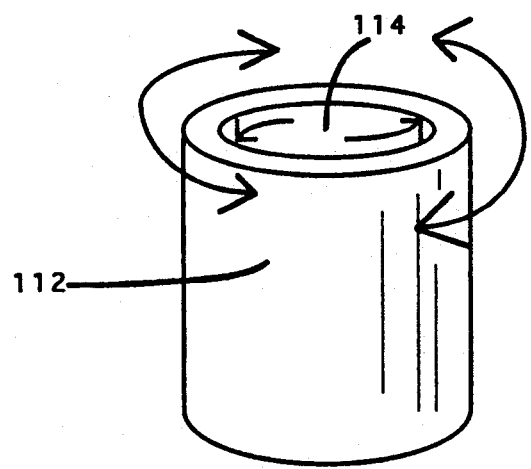
FIG. 1A is a schematic perspective view showing a unirotary ratchet bearing suitable for use in the present invention.

Referring now to the drawings, a deburring tool 100 according to one embodiment of the present invention is shown in exploded front elevation view in FIG. 1.

The tool 100 comprises an elongate, generally cylindrical handle member 102, which in the embodiment shown has a knurled main portion 104, and a frustoconical distal portion 106, with a bearing cavity 108 in the upper portion of the handle member.

The main knurled portion 104 may have knurling 110 applied thereto by conventional machining. Alternatively, the handle member 102 may be provided with an otherwise roughened surface, or a separate grip element or other member facilitating manual grasping of such handle member may be applied thereto. For example, gripability-enhancing appliques may be disposed on the outer surface of the handle member, or alternatively the handle member may be formed in the first instance with a configuration facilitating gripability.

The bearing cavity 108 is sized and shaped for accommodation of a unirotary ratchet bearing 112, which may for example comprise a FAFNIR TM unirotary ratchet bearing or other unirotary ratchet bearing therein. The bearing 112, which is schematically illustrated in FIGS. 1 and 2, in turn is fabricated with a bore 114 therein for receiving the deburring tip element 116, along the shank 118. The tip element features an enlarged cylindrical frontal portion 120, from which the conical tip 122 forwardly extends. On its exterior surface, the conical tip 122 comprises a deburring surface of appropriate design, including lands, grooves, blade surfaces, etc., as desired and appropriate to the end use of the deburring tool.

The deburring tool 100 further comprises a support element in the form of ball bearing 124, which is reposed in the floor of the cavity 108, as shown in the assembled tool drawing of FIG. 2, wherein all parts and features are numbered correspondingly with respect to FIG. 1.

Thus, the bearing support element 124 is disposed in cavity 108. The cavity 108 is of a suitable size and shape for receiving the unirotary ratchet bearing 112, which in turn receives the shank 118 of tip element 116 in the bore 114 of bearing 112. In the assembled form of the tool, the proximal face 126 of tip element 116 is in abutting contact with the ball bearing support element 124, so that the tip element can freely rotate with the unirotary ratchet bearing 112, when the tip element is in a rotating mode in the driven direction of the unirotary ratchet bearing.

FIG. 3 shows a cross-sectional elevation view of a deburring tool 200 according to another embodiment of the invention, comprising a handle member 202 with a main cylindrical body 204 and a frustoconical distal portion 206. A cavity 208 in provided in the distal part of the handle member 202. This cavity 208 is bounded by the cylindrical interior wall surface 210 and of the support element conical projection 212 at the lower end of the cavity.

Cavity 208 has a unirotary ratchet bearing 214 disposed therein, with the bearing having a central bore for receiving the deburring tip element 216 therewithin. The unirotary ratchet bearing 214, which is schematically illustrated in FIG. 3, thus engages the shank 218 of the tip element, while the proximal face of the tip element is in abutting contact with the support element 212, whereby the tip element can freely rotate against the tip of the support element while being driven by the unirotary ratchet bearing 214. The purpose of the support element is to provide a minimal contact area with the distal tip, so as to facilitate rotation of the tip element in the driven mode and freewheeling of the tip element in the non-driven mode while minimizing friction associated with such modes of operation.

The tip element 216 comprises an intermediate cylindrical portion 220 and a distal conical portion 222, with a deburring structure 224 on the conical tip outer surface, formed of suitable bladed or landed-and-grooved surface portions, etc.

From the foregoing, it will be recognized that the unirotary ratchet bearing may be of any suitable type and may take various configurations relative to the bearing shown in simplified schematic form in the illustrative drawings of FIGS. 1-3. It will also be appreciated that the deburring tool may be modified with a bearing structure and control means, so that the tip element associated with the deburring tool may be driven selectively in either direction of rotation, in the manner of a bi-directional ratchet wrench conventionally employed with a socket set. For this purpose, corresponding bearings to those used in ratchet wrenches may likewise be employed, with a control lever or other suitable means being coupled with the bidirectional bearing and exteriorly mounted, so that the user may manually select a particular setting, for rotation in a selected one of the two opposing rotational directions.

As an example of a modification of the disclosed invention, the deburring tool may feature a bi-directional ratchet bearing in the proximal end of the handle member which is coupled to a tip element mounted at the distal end of the handle member, such that a selected direction of rotation can be established by selective positioning of a ratchet lever on the proximal face of the handle member, to selectively block clockwise or counterclockwise movement of the tip element, as desired.

As a further modification example, the proximal end of the handle member of the deburring tool may be configured with a proximal bearing having a screwdriver-engageable proximal slotted face, whereby a Phillips-type or flat-type screwdriver blade may be engaged with the slotted face and used to rotate the tip element.

Further, the deburring tool of the present invention may advantageously employ a magnetic unirotary ratchet bearing, if the tool is used in an application (end-use) environment where such magnetic bearing component is non-deleterious in effect.

In the use of the deburring tool of the present invention, the tip element is driven in the desired direction of rotation by manual rotation of the handle, with the deburring surface at the distal extremity of the tip element being engaged with the flash-bearing hole or opening of the workpiece. The deburring surface of the tip element thereby engages the flashing or burr, and abraidingly removes same from the workpiece. The manual rotation direction of the handle then is reversible without rotation of the tip element after a single manual stroke. In this manner, further rotation can be imparted to the tip element with the next manual turn of the handle, in the same rotational direction as effected during the first manual rotational stroke effecting turning of the handle member of the tool.

It therefore will been appreciated that the deburring tool of the present invention is of an extremely simple mechanical form, but solves a variety of problems associated with the structure and operation of prior art deburring hand tools.

The tool of the present invention is compact in form, and therefore readily removes flashing associated with holes in workpieces of limited areal extent or accessibility, where prior art off-set deburring tools cannot be used, or otherwise are difficult to access to the flashing-bearing site to be deburred.

Further, the tool is usefully employed by individuals of widely varying hand/arm rotational ability, so that the tool can be used equally effectively by persons with only a limited ability insofar as hand rotational movement is concerned, as well as by persons having a more extensive range of hand rotational movement, due to the ratchet character of the tool.

Additionally, the tool is very durable, since friction is minimized by the support element structure of the invention, thereby avoiding excessive rates of wear on the tip element employed with the tool.

Finally, the tool of the invention readily accommodates a wide variety of tip element types and sizes, with respect to varyingly sized unirotary ratchet bearings which may be employed in various embodiments of the tool. In this respect, unirotary ratchet bearings of adjustable character, accommodating varying tip element shank diameters in the same bearing assembly, may be employed in the handle member within the broad scope of the present invention.

While the invention has been described with respect to various features, embodiments and alternative structures, it will be appreciated that numerous variations, modifications, and other embodiments are possible, and accordingly the invention is to be broadly construed with respect to all such variations, modifications, and other embodiments.

What is claimed is:

1. A hand-held deburring tool for removing burring or flashing surrounding openings in workpiece articles formed by drilling, milling, punching, tapping, or like operations, said tool consisting essentially of:
    (a) an elongate, generally cylindrical handle member of a manually graspable size, having (i) an elongate cylindrical main body portion and (ii) a distal portion, said main body portion and said distal portion being coaxially aligned with respect to each another, with (iii) a central cylindrical bore opening which (a) is coaxial with the distal portion and with the main body portion, and (b) extends longitudinally from said distal extremity through the distal portion to a terminus in a distal part of the main body portion, in the vicinity of said junction of the distal portion with the main body portion;
    (b) a unirotary ratchet bearing mounted in the central bore opening, and having an inner cylindrical surface defining a central passage through the unirotary ratchet bearing for engaging the shank of a deburring tip element positioned therewithin;
    (c) a support element mounted in a lower portion of said central bore opening for abutting contact with a proximal shank extremity of a deburring tip element positioned within the central passage of said unirotary ratchet bearing, said support element presenting an abutting contact surface area of substantially smaller size than the cross-section of the central bore opening;
    a deburring tip element comprising a proximal cylindrical shank portion with a longitudinal axis, and a distal tip portion of enlarged cross-section relative to the cylindrical shank portion, said cylindrical shank portion (i) having a flat proximal face at its proximal extremity which is generally perpendicular to the longitudinal axis of the cylindrical shank portion, and (ii) extending through the central passage of the unirotary ratchet bearing with the flat proximal face in abutting supported contact with the abutting contact surface area of the support element;
    wherein the unirotary ratchet bearing is engaged with the cylindrical shank portion of the deburring tip element so that (a) manual rotation of the handle member in a first direction of rotation will couplingly rotate the deburring tip element in said first direction, and (b) manual rotation of the handle member in a section direction of rotation, opposite said first direction of rotation, will be non-driving of the deburring tip element, so that the handle member in said second direction of rotation is manually rotatable against the deburring tip element without effecting rotation thereof.

2. A deburring tool according to claim 1, wherein the support element comprises a ball bearing support member mounted in the lower portion of the central bore opening in the handle member.

3. A deburring tool according to claim 1, wherein the support element comprises a projection element extending upwardly from the lower portion of the central bore opening in the handle member.

4. A tool according to claim 1, wherein the unirotary ratchet bearing comprises a sleeve-type, elongate, cylindrical ratchet bearing.

5. A deburring tool according to claim 1, wherein the handle member is knurled.

6. A deburring tool according to claim 1, wherein the handle member has a frustoconical-shaped distal portion.

7. A hand-held deburring tool for removing burring or flashing surrounding openings in workpiece articles formed by drilling, milling, punching, tapping, or like operations, said tool consisting essentially of:
    (a) an elongate, generally cylindrical handle member of a manually graspable size, having (i) an elongate cylindrical main body portion and (ii) a distal portion, said main body portion and said distal portion being coaxially aligned with respect to each another, with (iii) a central cylindrical bore opening which (a) is coaxial with the distal portion and with the main body portion, and (b) extends longitudinally from said distal extremity through the distal portion to a terminus in a distal part of the main body portion, in the vicinity of said junction of the distal portion with the main body portion;
    (b) a unirotary ratchet bearing mounted in the central bore opening, and having an inner cylindrical surface defining a central passage through the unirotary ratchet bearing for engaging the shank of a deburring tip element positioned therewithin;
    (c) a support element mounted in a lower portion of said central bore opening for abutting contact with a proximal shank extremity of a deburring tip element positioned within the central passage of said unirotary ratchet bearing, said support element presenting an abutting contact surface area of substantially smaller size than the cross-section of the central bore opening;
    a deburring tip element comprising a proximal cylindrical shank portion with a longitudinal axis, and distal tip portion of enlarged cross-section relative to the cylindrical shank portion, said cylindrical shank portion (i) having a flat proximal face at its proximal extremity which is generally perpendicular to the longitudinal axis of the cylindrical shank portion, and (ii) extending through the central passage of the unirotary ratchet bearing with the flat proximal face in abutting supported contact with the abutting contact surface area of the support element;

wherein the unirotary ratchet bearing is engaged with the cylindrical shank portion of the deburring tip element so that (a) manual rotation of the handle member in a first direction of rotation will couplingly rotate the deburring tip element in said first direction, and (b) manual rotation of the handle member in a second direction of rotation, opposite said first direction of rotation, will be non-driving of the deburring tip element, so that the handle member in said second direction of rotation is manually rotatable against the deburring tip element without effecting rotation thereof; and wherein the cylindrical bore opening has a generally concave surface at said terminus thereof, and said support element consists of a single ball bearing reposed on said generally concave surface in said cylindrical bore opening and presenting said abutting contact surface area to the flat proximal face of the deburring tip element bearing thereagainst.

8. A hand-held deburring tool, for removing burring or flashing surrounding openings in workpiece articles formed by drilling, milling, punching, tapping or like operations, said tool consisting essentially of:

an elongate handle member of a manually graspable size, having (i) an elongate cylindrical main body portion and (ii) a frustoconical distal portion of convergent cross-section from a larger cross-sectioned rear part, at the junction of the frustoconical distal portion with the main body portion, to a smaller cross-sectioned distal extremity, said main body portion and said frustoconical distal portion being coaxially aligned with respect to each another, with (iii) a central cylindrical bore opening which (a) is coaxial with the frustoconical distal portion and with the main body portion, and (b) extends longitudinally from said distal extremity through the frustoconical distal portion to a terminus in a distal part of the main body portion, in the vicinity of said junction of the frustoconical distal portion with the main body portion;

a support element in the cylindrical bore opening at said terminus thereof presenting a substantially point-contact bearing support surface;

a sleeve-type, elongate, cylindrical unirotary ratchet bearing having (i) an outer cylindrical surface received within the central bore opening, and (ii) an inner cylindrical surface defining a central passage through the unirotary ratchet bearing; and a deburring tip element comprising a proximal cylindrical shank portion with a longitudinal axis, and a distal tip portion of enlarged cross-section relative to the cylindrical shank portion, said cylindrical shank portion (i) having a flat proximal face at its proximal extremity which is generally perpendicular to the longitudinal axis of the cylindrical shank portion, and (ii) extending through the central passage of the unirotary ratchet bearing with the flat proximal face in abutting supported contact with the bearing support surface of the support element;

wherein the unirotary ratchet bearing is engaged with the cylindrical shank portion of the deburring tip element so that (a) manual rotation of the handle member in a first direction of rotation will couplingly rotate the deburring tip element in said first direction, and (b) manual rotation of the handle member in a second direction of rotation, opposite said first direction of rotation, will be non-driving of the deburring tip element, so that the handle member in said second direction of rotation is manually rotatable against the deburring tip element without effecting rotation thereof.

9. A deburring tool according to claim 8, wherein the cylindrical bore opening has a generally concave surface at said terminus thereof, and said support element consists of a single ball bearing reposed on said generally concave surface in said cylindrical bore opening and presenting said substantially point-contact bearing support surface to the flat proximal face of the deburring tip element bearing thereagainst.

10. A deburring tool according to claim 8, wherein said support element consists of a conical projection extending proximally from the terminus of the cylindrical bore opening to a proximal extremity presenting said substantially point-contact bearing support surface to the flat proximal face of the deburring tip element bearing thereagainst.

* * * * *